United States Patent
Yu et al.

(10) Patent No.: US 8,194,991 B2
(45) Date of Patent: Jun. 5, 2012

(54) OUT-OF-ORDER CODING

(75) Inventors: Tianli Yu, Foster City, CA (US); Jim Crenshaw, Palatine, IL (US)

(73) Assignee: Motorola Mobililty, Inc., Horsham, PA (US)

(*) Notice: Subject to any disclaimer, the term of this patent is extended or adjusted under 35 U.S.C. 154(b) by 898 days.

(21) Appl. No.: 12/254,819

(22) Filed: Oct. 20, 2008

(65) Prior Publication Data

US 2010/0098346 A1    Apr. 22, 2010

(51) Int. Cl.
*G06K 9/00* (2006.01)

(52) U.S. Cl. ..................................................... 382/251

(58) Field of Classification Search .................... None
See application file for complete search history.

(56) References Cited

U.S. PATENT DOCUMENTS

| | | |
|---|---|---|
| 5,319,749 A | 6/1994 | Haaker et al. |
| 6,067,384 A | 5/2000 | Manickam et al. |
| 7,146,053 B1* | 12/2006 | Rijavec et al. ............... 382/233 |
| 2005/0230487 A1* | 10/2005 | Lapstun et al. ............... 235/494 |
| 2007/0165955 A1 | 7/2007 | Hwang et al. |

FOREIGN PATENT DOCUMENTS

| | | |
|---|---|---|
| EP | 1 594 314 | 4/2005 |
| EP | 1947605 A2 * | 7/2008 |
| JP | 2006-191628 A | 7/2006 |
| KR | 10-2006-0009898 A | 2/2006 |
| WO | WO2005050567 | 6/2005 |

OTHER PUBLICATIONS

PCT Search Report & Written Opinion, Re: Application # PCT/US2009/061010 Apr. 23, 2010.

* cited by examiner

*Primary Examiner* — Stephen R Koziol
*Assistant Examiner* — Nirav G Patel

(57) ABSTRACT

A block encoder is operable to encode a target region of an image. The encoder encodes blocks from a target region of an image. The encoded blocks are stored in a scan order of the image. The encoded blocks are reordered into a scan order for the target region, and are output as an encoded image bit stream.

11 Claims, 5 Drawing Sheets

OUT-OF-ORDER CODING

BACKGROUND

In some instances, a user may desire to extract a portion of an encoded image. For example, a JPEG-encoded image includes a picture of a child's art work. The picture is sent to the grandparents. The grandparents may want to extract the child's art work from the encoded image. In another example, an encoded image may include multiple people. A user may want to extract a portion of the image that includes a particular person.

In these instances, to extract the desired portion of the encoded image, typically, the entire image must be decoded and stored in a buffer. Many devices, such as cellular phones, personal digital assistants, etc., have limited memory. As a result, the requirement of decoding an entire image and storing the entire decoded image in a buffer for extracting a desired portion of the image may not allow these devices of limited memory to perform this function. This is undesirable, because users of devices, such as cellular phones or other portable devices, tend to like having the same functionality on their portable devices as they have with their personal computers.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, well known methods and structures may not be described so as not to unnecessarily obscure the description of the embodiments.

According to an embodiment, a coding system provides for encoding a target region within an image. The coding system receives an encoded image and uses a "moving buffer" to partially decode the image. Blocks of the target region in the moving buffer are identified, compressed and re-ordered into a scan order for the target region to create an encoded image of the target region. The moving buffer allows less memory to be used for the target region extraction process and also improves performance. Scan order is the pattern used to detect, reconstruct and/or store an image. Raster scan is a commonly used scan order.

Coding may include encoding, decoding, or other related functions. The moving buffer may not actually be a buffer. For example, the moving buffer may represent a moving window that covers a portion of an image at a time, and moves on to another portion of the image, and so on. Each portion under the window is scanned to identify whether any blocks that are scanned are blocks in the target region. Blocks from the target region are stored in an actual buffer, which may be memory or some other data storage. These blocks are re-ordered and encoded. A block may be a macroblock, such as a 16-by-16 block of pixels, or a block of pixels of another size. Also, a target region encompasses a region of an image that is smaller in size than the entire image, and the target region may have sides that are misaligned with the sides of the region.

Figure 1:
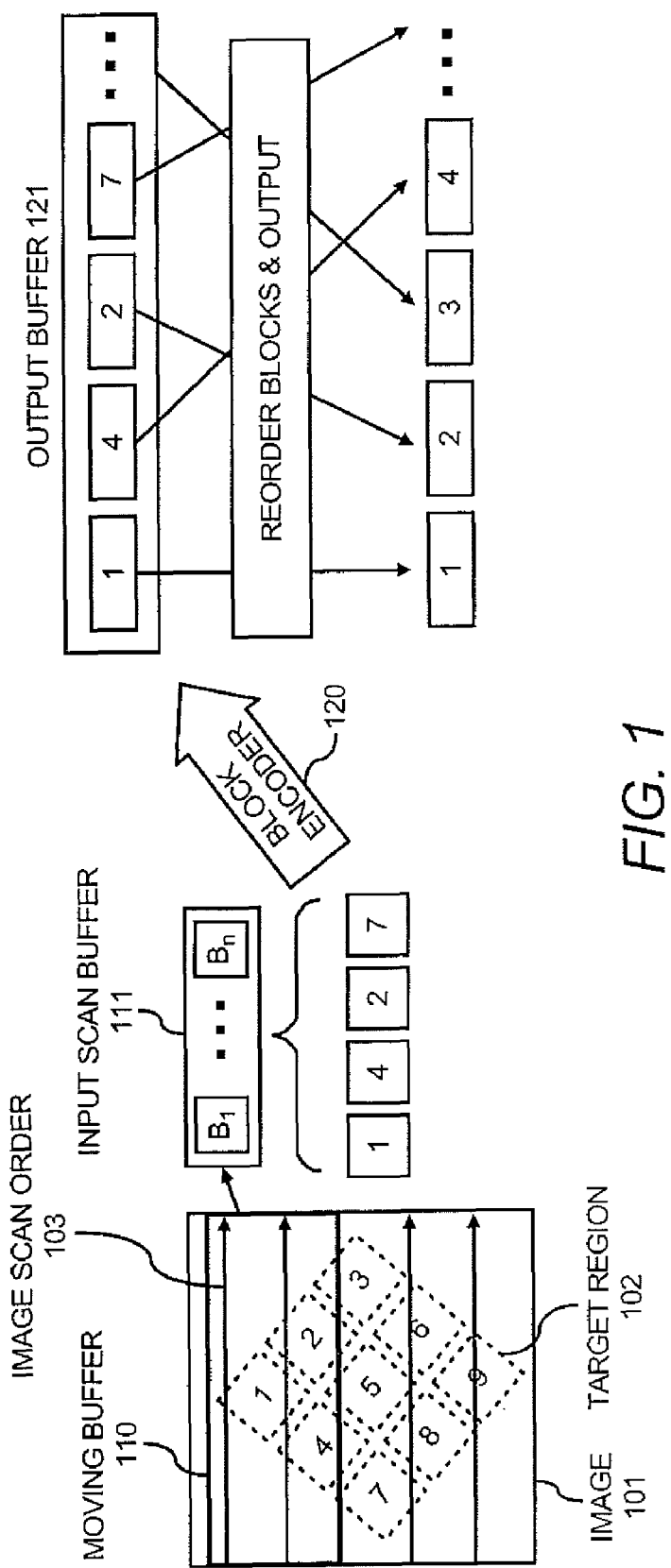
FIG. 1 illustrates a data flow diagram for encoding a target region of an image, according to an embodiment.

FIG. 1 illustrates a data flow diagram for a coding system 100, according to an embodiment. An image bit stream is received and decoded, portion-by-portion. The image bit stream may include bits for a single encoded image, or bits for multiple encoded images.

A representation of an image in a received bit stream is shown as image 101. The image 101 includes a target region 102, which in this example comprises blocks 1-9. The target region 102 may be a region of the image 101 that is of interest to a user. The target region 102 may be selected by a user. In other examples, the target region 102 may be selected by a computer.

The image 101 is an encoded image including blocks encoded in a particular scan order, referred to as the image scan order 103. One popular scan order is raster scan order. As shown in FIG. 1, the arrows of the image scan order 103 are representative of a raster scan order. Raster scan order of the image 101 goes block-by-block, horizontally along the top edge, left-to-right, row-by-row, for each row of blocks starting at the top left.

A moving buffer 110 is used to decode the image 101 in the image scan order 103. The moving buffer 110 identifies a portion of the image 101 to be decoded. The moving buffer 110 operates as a moving window covering a portion of the image 101. The blocks in the moving buffer 110 are decoded and stored in an input scan buffer 111. The input scan buffer 111 does not need to be so large as to be able to store the entire decoded image. The input scan buffer 111 should be large enough to store at least one block.

The decoded blocks in the moving buffer 110 are shown as $B_1$-$B_n$ and are stored in the input scan buffer 111 in the image scan order 103. The input scan buffer 110 may be a first-in-first-out buffer. The moving buffer 110 moves to another portion of the image, and the blocks in the current portion under the moving buffer 110 fill the input scan buffer 111 over-writing the old blocks. The moving buffer 110 may move by covering non-overlapping portions of the image 101, portion-by-portion, until all blocks from the target region 102 are identified or until all the blocks of the image 101 are decoded. In other embodiments, the moving buffer 110 may move by covering overlapping portions of the image 101, portion-by-portion.

A block encoder 120 identifies blocks from the target region 102 that are in the input scan buffer 111. A block encoder encodes blocks one at a time. A JPEG encoder is an example of a block encoder. As the blocks $B_1$-$B_n$ are stored in the input scan buffer 103 in the image scan order 103, the block encoder 120 identifies blocks from the target region 102 in that order. For example, as shown, block 1 of the target region 102 is first identified, then block 4, then block 2, then block 7, etc., until all the blocks of the target region 102 are identified. As the blocks of the target region are identified, the block encoder 120 encodes them, and stores the encoded blocks in an output buffer 121 in the image scan order 103.

In order to create an encoded image comprised of the target region 102, the blocks in the output buffer are reordered in a scan order of the target region, referred to as the target region scan order 104. The target region scan order 104 may also be a raster scan order. However, the target region scan order 104 differs from the image scan order 103, because of the misalignment of the target region 102 with the image 101. In particular, note that the sides of the target region 102 are not parallel with the sides of image 101, which is the misalignment and results in different scan orders of the same blocks. This is further illustrated with respect to FIG. 2.

Figure 2:
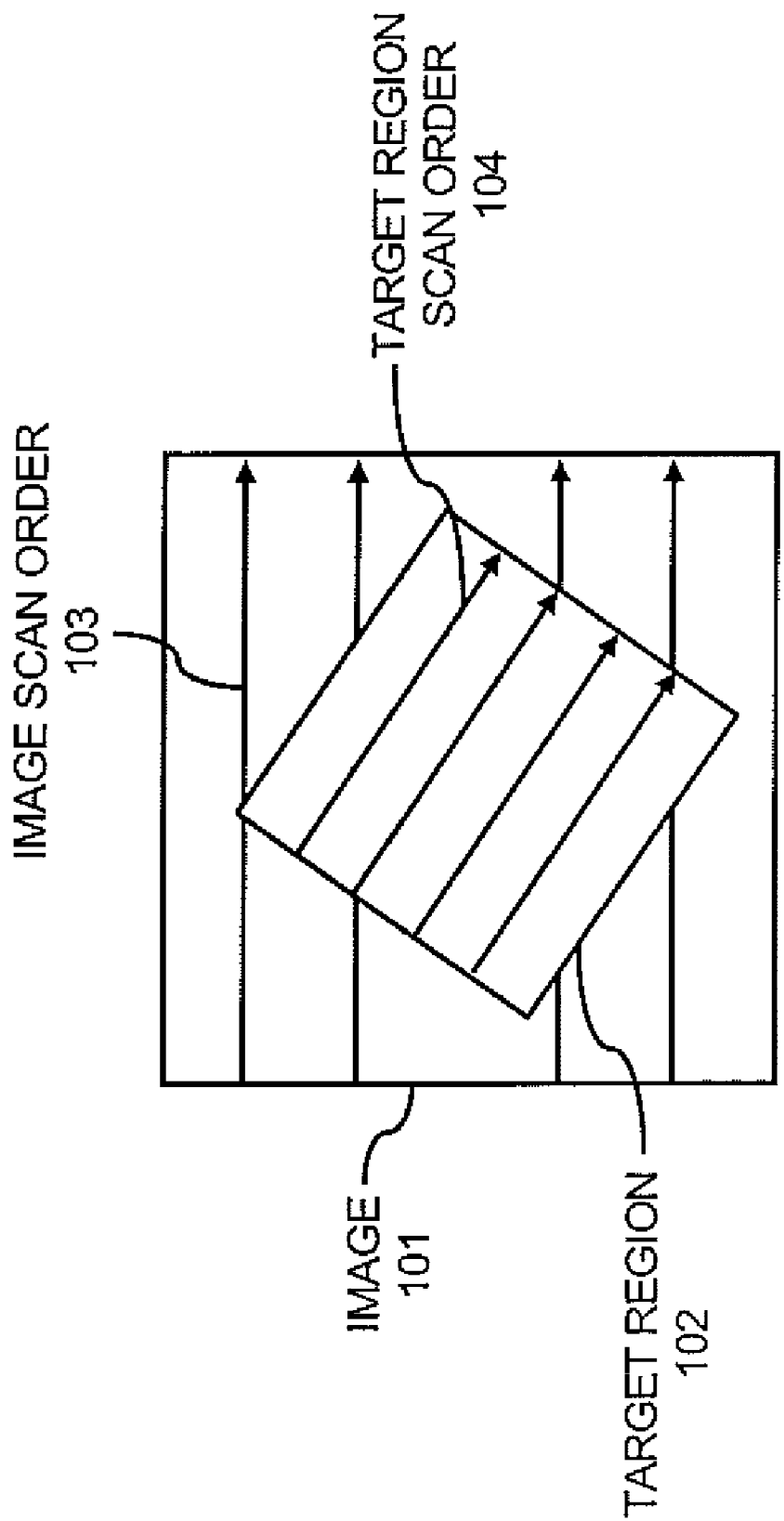
FIG. 2 illustrates different scan orders for the image and the target region.

FIG. 2 shows the image scan order 103 and the target region scan order 104. The block encoder 120 encodes blocks of the target region 102 in the image scan order 103, as shown in the output buffer 121. However, those same blocks of the target region need to be in the target region scan order 104, for example, as a requirement for the type of encoding. For example, JPEG and MPEG encoding requiring encoding in raster scan order, starting from the top, left of the image. For the target region 102, the top, left of the image in the target region 102 is block 1, because the image in the target region is misaligned with the image 101. The raster scan order of the target region 102 is shown as the target region scan order 104. Accordingly, the target region blocks in the output buffer 121, which are ordered in the image scan order 103, need to be reordered to the target region scan order 104, for example, to create a JPEG encoded image bit stream. FIG. 1 shows the reordering of the target region blocks to the target region scan order 104. These reordered blocks may be output by the block encoder 120 as an encoded image bit stream.

In addition to reordering the target region blocks 1-9, the block encoder 120 may also recalculate DC coefficients for the reordered blocks of the target region based on a difference of one or more previous blocks. This recalculation of the DC coefficients may be needed depending on the type of encoding being performed. For example, JPEG encoding creates a DC coefficient for a block that is dependent on the previous block. The DC coefficient data is small compared to the total amount of data in a block.

Figure 3:
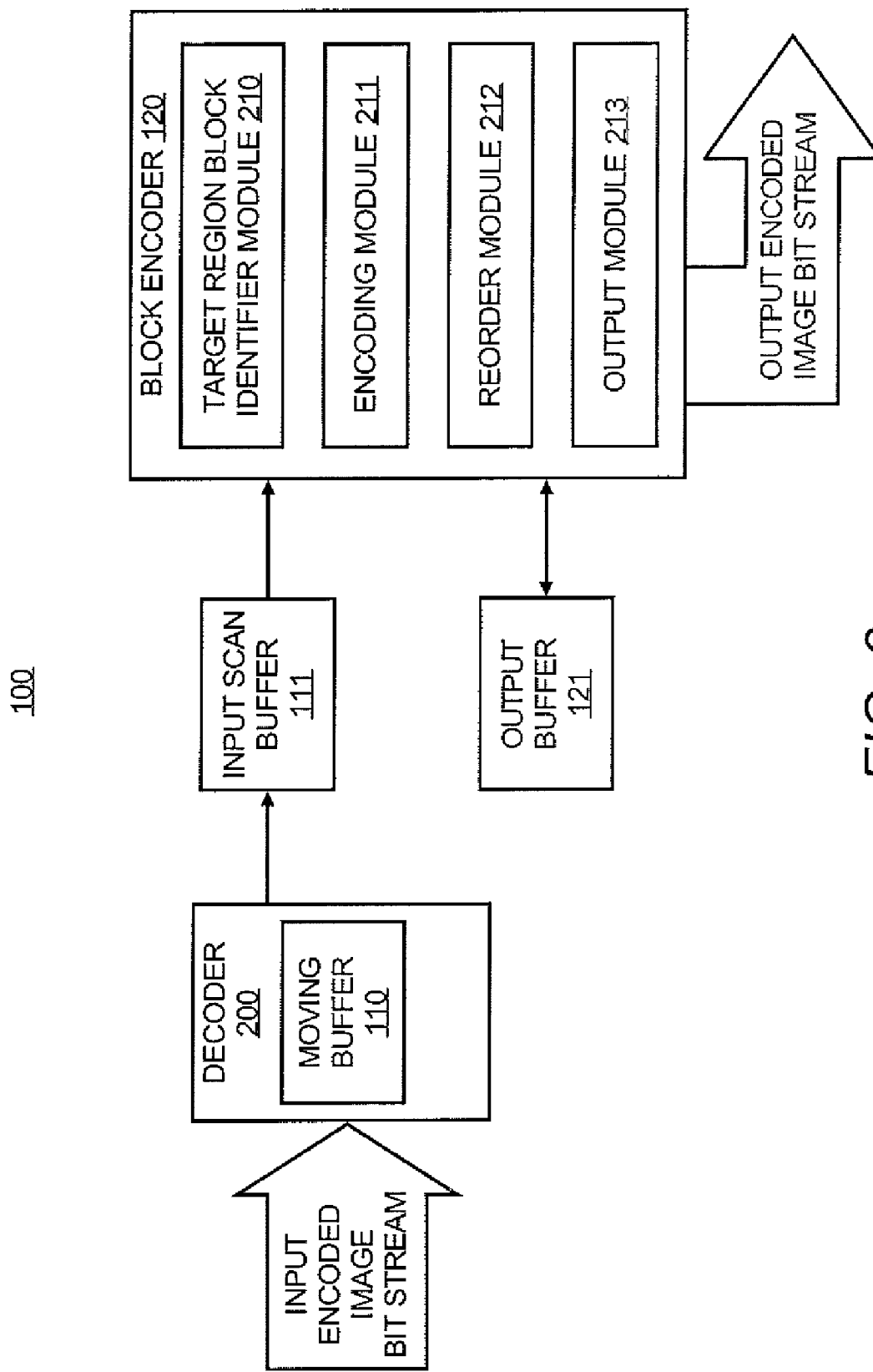
FIG. 3 illustrates a system for coding a target region, according to an embodiment.

FIG. 3 illustrates the coding system 100, according to an embodiment. The coding system 100 is described with respect to FIG. 1. The coding system 100 includes a decoder 200 that receives an image bit stream of one or more encoded images. The decoder 200 uses the moving buffer 110 shown in FIG. 1 to decode an image, portion-by-portion, as described above. The input scan buffer 111 stores the decoded blocks in the image scan order 103. The block encoder 120 identifies the target region blocks, e.g., blocks 1-9 shown in FIG. 1, from the input scan buffer 111 as the image 101 is decoded portion-by-portion and encodes the blocks. The encoded blocks are stored in the output buffer 121 in the image scan order 103. The block encoder 120 reorders the target region blocks into the target region scan order 104, and outputs an encoded image bit stream.

The block encoder 120 may include a target region block identifier module 210, and encoding module 211, a reorder module 212 and an output module 213. Modules may include software and/or hardware. The target region block identifier module 210 identifies target region blocks that are in the input scan buffer 111. A conventional geometric transform can be used to identify blocks from the image 101 that are blocks in the target region 102. The purpose of the geometric transform is to relate the position of each desired output pixel (i.e, pixels in the target region 102) to the corresponding pixels in the original image 101. Many such transforms exist. For a fairly general example, consider a picture of a road sign taken from a car on the road nearby. Suppose that the sign itself is rectangular. Its image in the picture will form a quadrilateral that will not be a rectangle and in general may not even be a trapezoid. Imagine that the sign has a coordinate system with axes parallel to its sides. The relationship between points in that coordinate system to those in the picture is known as a perspectivity and once the corners of the sign are indicated in the original image, it is a straightforward application of well-known geometry to derive the formulas to translate between the two systems. To complete the example, suppose that we wish to create an output image of the sign as it appears from directly in front (i.e., a true undistorted rectangle or what is technically known as a frontal orthogonal view.) Suppose further that we specify an output resolution, say m by n. The set of m×n pixels, then, forms a regular grid on the output image and therefore in the coordinate system of the sign. By using derived formulas, we are applying a geometric transformation at each output pixel to find out which pixels it relates to in the original. It will be appreciated by those skilled in image signal processing that finding the new pixel color value involves re-sampling, using for instance, a technique like bicubic interpolation. By considering each pixel in any given output image block and finding the corresponding pixels necessary for resampling in the original image, it is easy to enumerate the original image blocks that must be decoded to render the selected output block.

The encoding module 211 encodes the target region blocks from the input scan buffer 111 in the image scan order 103, and stores the encoded blocks in the image scan order 103 in the output buffer 121. The reorder module 212 reorders the blocks in the target region scan order 104. The output module 213 recalculates the DC coefficients based on the new order and outputs an encoded image bit stream. This may be a fully compatible JPEG encoded bit stream.

There may be situations where the blocks of the target region 102 do not need to be reordered. For example, the sides of the target region 102 may be aligned with the image 101. In those situations, the reorder module 212 confirms, for example, based on the geometric transformation that the blocks of the target region 102 do not need to be reordered. In one embodiment, the reorder module 212 determines whether the blocks of the target region 102 need to be reordered, for example, based on the geometric transformation. Then, the blocks are reordered in response to determining the blocks are reordered. Otherwise, the blocks are not reordered.

Figure 4:
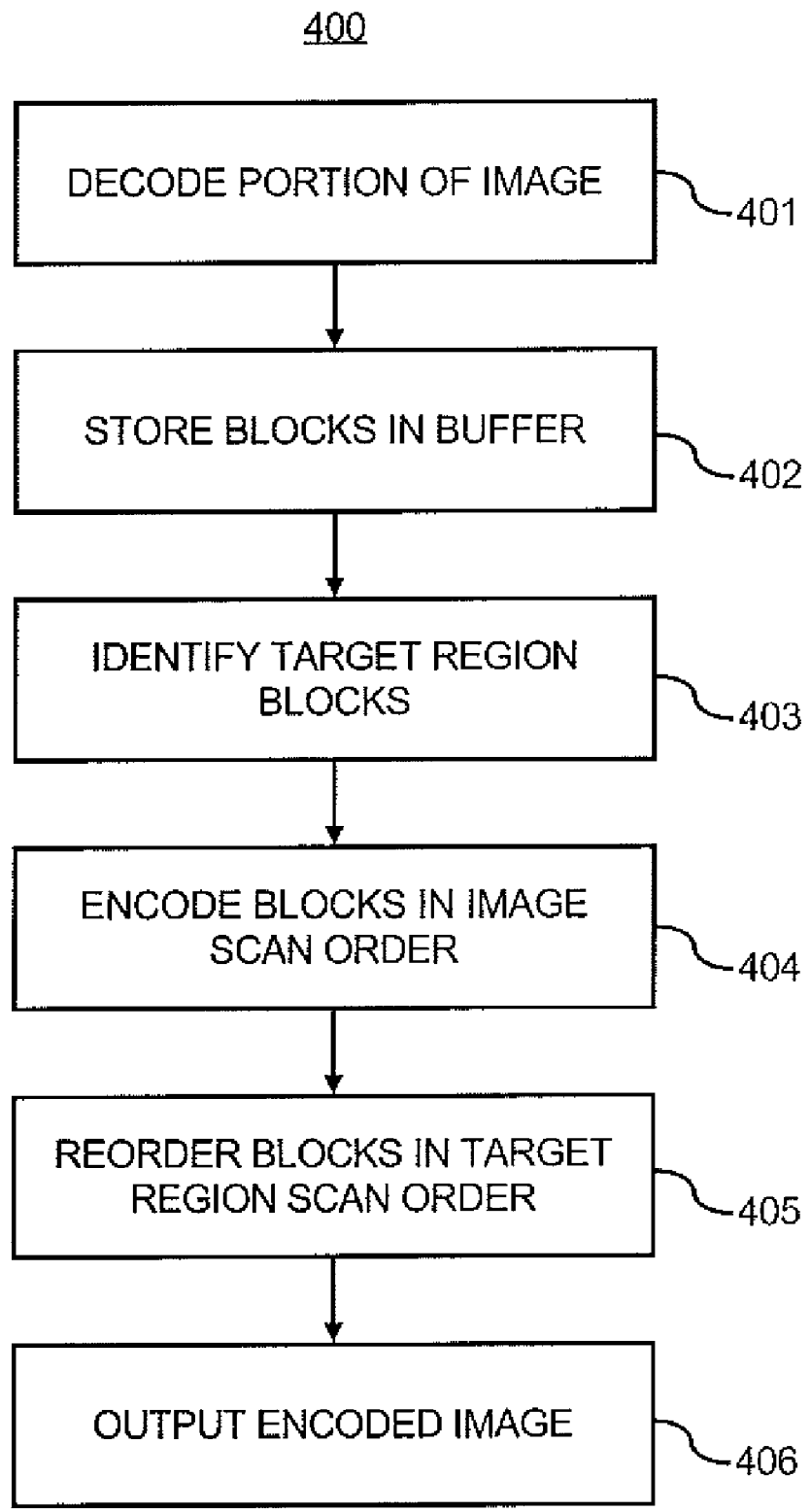
FIG. 4 illustrates a flow diagram of a method for encoding a target region, according to an embodiment.

FIG. 4 illustrates a method 400 for encoding a target region of an image, according to an embodiment. FIG. 4 is described with respect to one or more of FIGS. 1-3 by way of example and not limitation.

At step 401, a portion of an image is decoded, for example, using the moving buffer 110 shown in FIG. 1.

At step 402, the decoded blocks are stored in the input scan buffer 111 in the image scan order 103.

At step 403, any target region blocks 1-9 that may be in the decoded portion of the image are identified from the blocks in the input scan buffer 103. A geometric transform may be used to identify the blocks in the target region.

At step 404, the target region blocks, as identified from the input scan buffer 111, are encoded and stored in the output buffer 121 in the image scan order 103. Encoding includes compressing the decoded blocks. The encoding may include encoding according to a standard, such as JPEG.

At step 405, the encoded blocks are reordered according to the target region scan order 104. An indexing structure or table may be used to reorder the blocks.

At step 406, the reordered blocks are output as an encoded image bit stream.

The steps 401-406 are repeated, as the image 101 is decoded portion-by-portion to generate an encoded image bit stream comprised of the target region 102. This encoded bit stream may be a JPEG encoded bit stream or other types of encoded bit stream.

Figure 5:
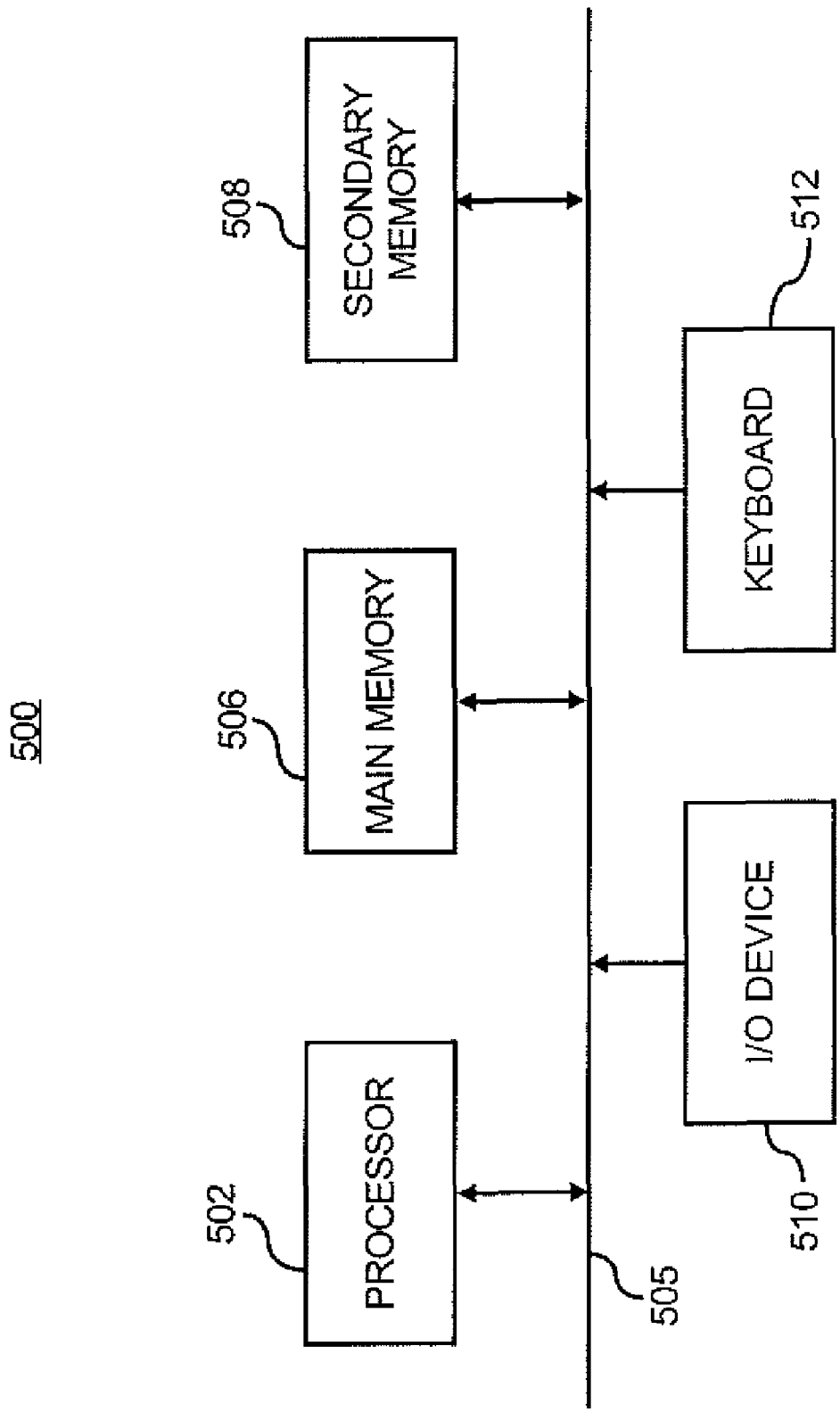
FIG. 5 illustrates a computer system that may be used as a platform for the coding system, according to an embodiment.

FIG. 5 illustrates a block diagram of a general purpose computer system 500 that represents a platform for the computer systems in the system 100 described above. The computer system 500 represents a platform that may be used for the coding system 100.

The computer system 500 includes processing circuitry 502 providing an execution platform for executing software, which may include software for the modules of the encoder 120 and software for the decoder 200 described above. Commands and data from the processing circuitry 502 are communicated over a communication bus 505. The computer system 500 also includes a main memory 506, such as a Random Access Memory (RAM), where software may reside during runtime, and a secondary memory 508. The input scan buffer 111 and the output buffer 121 may be part of the main memory 506. The secondary memory 508 includes, for example, non-volatile memory, a hard disk drive, and/or a removable storage drive. A copy of the software may be stored in the secondary memory 508.

The computer system 500 may include I/O devices 510. The I/O devices 510 may include a display and/or other user interfaces, such as a keyboard, a mouse, a stylus, touchscreen, remote control, and the like. A communication interface 512 is provided for communicating with other computer systems. The communications interface 512 may facilitate connection to one or more networks. For some computer systems, the communications interface 512 may represent multiple interfaces, such as an IP network interface, Bluetooth interface, and/or a cellular network interface. The computer system 500 may include many other well known components not shown. Also, the computer system 500 be used for a personal computer, cellular phone and other hand held devices, a set top box, and other electronic devices.

One or more of the methods, other steps and modules described herein are operable to be implemented as software stored on a computer readable medium, such as the memory 506 and/or 508, and executed on the computer system 500, for example, by the processing circuitry 502.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. An apparatus operable to encode a target region of an image that comprises a stream of compression encoded image blocks, wherein the target region is a region of the image misaligned with the image, the apparatus comprising:
    a target block identifier that identifies target block sets, each target block set comprising a set of the compression encoded image blocks that are needed to form one compression encoded target block of a set of compression encoded target blocks that form the target region;
    a decoder module that
        decodes, in a scan order of the image, a set of compression encoded image blocks that includes the target block set, thereby generating a corresponding set of decoded image blocks, and
        stores in an input buffer, while each of the compression encoded target blocks is formed, the set of decoded image blocks;
    an encoder module that
        forms compression encoded target blocks, wherein each compression encoded target block is formed using decoded image blocks in the input buffer that were decoded from the target block set of compression encoded image blocks, and
        sequentially stores in an output buffer each of the compression encoded target blocks, in an input order that is the order in which the compression encoded target blocks are formed; and
    a reorder module operable to reorder the compression encoded target blocks of the target region stored in the output buffer into a scan order of the target region, wherein the scan order of the target region is different than the scan order of the image.

2. The apparatus of claim 1, further comprising:
    an output module operable to recalculate DC coefficients for the reordered compression encoded target blocks of the target region based on a difference of one or more previous compression encoded target blocks, and output the reordered compression encoded target blocks as an encoded image bit stream.

3. The apparatus of claim 1, wherein the target block identifier uses a geometric transform to identify the target block sets.

4. The apparatus of claim 1, wherein the scan order of the target region is a raster scan order of the target region and the scan order of the image is a raster scan order of the image.

5. The apparatus of claim 1, wherein the target region is a region of the image misaligned with sides of the image.

6. The apparatus according to claim 1, wherein the input buffer is smaller than required for storing the entire image in decoded form.

7. The apparatus according to claim 1, wherein the set of compression encoded image blocks is a portion of the compression encoded image blocks of the image consisting of a consecutive sequence of raster scanned compression encoded image blocks.

8. A method for encoding a target region of an image that comprises a stream of compression encoded image blocks, wherein when the target region is a region of the image misaligned with the image, wherein the method comprises:
    identifying a target block set that comprises a set of compression encoded image blocks that are needed to form one compression encoded target block of a set of compression encoded target blocks that form the target region;
    decoding, in an scan order of the image, a set of compression encoded image blocks that includes the target block set, thereby generating a corresponding set of decoded image blocks;
    storing in an input buffer, while the compression encoded target block is formed, the set of decoded image blocks;
    forming the compression encoded target block, wherein the forming uses the decoded image blocks in the input buffer that were decoded from the target block set of compression encoded image blocks;
    storing in an output buffer the compression encoded target block, in an input order that is the order in which the compression encoded target blocks are formed;

repeating the steps of identifying, decoding, storing in an input buffer, forming, and storing in an output buffer for each of the compression encoded target blocks in the set of compression encoded target blocks; and re-ordering the compression encoded target blocks of the target region stored in the output buffer into a scan order of the target region, wherein the scan order of the target region is different than the scan order of the image.

9. The method of claim 8, further comprising:
using a geometric transform to identify the target blocks set.

10. The method of claim 8, further comprising:
recalculating DC coefficients for the reordered compression encoded target blocks.

11. The apparatus according to claim 8, wherein the set of compression encoded image blocks is a portion of the compression encoded image blocks of the image consisting of a consecutive sequence of raster scanned compression encoded image blocks.

* * * * *